US010255238B2

(12) United States Patent
Cammert et al.

(10) Patent No.: US 10,255,238 B2
(45) Date of Patent: Apr. 9, 2019

(54) CEP ENGINE AND METHOD FOR PROCESSING CEP QUERIES

(75) Inventors: Michael Cammert, Wettenberg (DE); Christoph Heinz, Marburg (DE); Jürgen Krämer, Alsfeld (DE); Tobias Riemenschneider, Schwalmstadt (DE)

(73) Assignee: SOFTWARE AG, Darmstadt (DE)

( * ) Notice: Subject to any disclaimer, the term of this patent is extended or adjusted under 35 U.S.C. 154(b) by 831 days.

(21) Appl. No.: 12/929,539

(22) Filed: Jan. 31, 2011

(65) Prior Publication Data
US 2012/0166469 A1 Jun. 28, 2012

(30) Foreign Application Priority Data

Dec. 22, 2010 (EP) .................................. 10196502

(51) Int. Cl.
G06F 17/30 (2006.01)
G06F 16/2455 (2019.01)
G06F 16/2453 (2019.01)

(52) U.S. Cl.
CPC .... G06F 16/24568 (2019.01); *G06F 16/2453* (2019.01); *G06F 16/24542* (2019.01)

(58) Field of Classification Search
CPC ......... G06F 17/30463; G06F 17/30442; G06F 17/30516
USPC ...................................................... 707/769
See application file for complete search history.

(56) References Cited

U.S. PATENT DOCUMENTS 7,457,728 B2 11/2008 Chen
7,676,461 B2 3/2010 Chkodrov
8,762,297 B2* 6/2014 Chandramouli .. G06F 17/30522
706/12
2005/0010556 A1* 1/2005 Phelan .............................. 707/3
2006/0106793 A1* 5/2006 Liang ................................ 707/5
2006/0136368 A1* 6/2006 Young-Lai et al. .............. 707/2
2008/0301124 A1* 12/2008 Alves et al. ...................... 707/5
2009/0070786 A1* 3/2009 Alves ..................... G06F 9/541
719/318
2009/0106214 A1* 4/2009 Jain .................. G06F 17/30516
707/E17.014
2009/0276367 A1* 11/2009 Rosenthal .............. G06Q 40/06
705/36 R
2010/0088325 A1* 4/2010 Goldstein ......... G06F 17/30516
707/756

OTHER PUBLICATIONS

Michael Cammert et al., "A Cost-Based Approach to Adaptive Resource Management in Data Stream Systems," IEEE Transactions on Knowledge and Data Engineering, vol. 20, No. 2, Feb. 1, 2008, pp. 230-245.

(Continued)

*Primary Examiner* — Apu M Mofiz
*Assistant Examiner* — Sheryl L Holland
(74) *Attorney, Agent, or Firm* — Nixon & Vanderhye, P.C.

(57) ABSTRACT

The present technology concerns a complex event processing (CEP) engine for processing CEP queries over data streams. The CEP engine has a parser, adapted for parsing a received CEP query into a logical query graph and a translator adapted for translating the logical query graph into a physical query plan in accordance with one of a plurality of data stream representations. The logical query graph is independent of the plurality of data stream representations.

21 Claims, 5 Drawing Sheets

(56) References Cited

OTHER PUBLICATIONS

Figure 1:
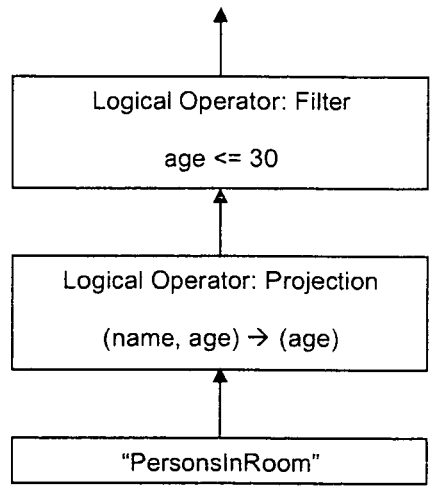

Jonas Jacobi et al., "A Physical Operator Algebra for Prioritized Elements in Data Streams," Dec. 1, 2009.
Thanaa M. Ghanem et al., "Incremental Evaluation of Sliding-Window Queries Over Data Streams," IEEE Transactions on Knowledge and Data Engineering, vol. 19, No. 1, Jan. 1, 2007.
Arasu et al., "The CQL Continuous Query Language: Semantic Foundations and Query Execution", Stanford University, 22 pages.
Ghanem et al., "Incremental Evaluation of Sliding-Window Queries over Data Streams", Walid Aref's research is supported in part by the National Science Foundation under Grants IIS-0093116 and IIS-0209120. pp. 1-35.
Kramer et al., "A Temporal Foundation for Continuous Queries over Data Streams", Department of Mathematics and Computer Science, Philipps-University Marburg, Germany, pp. 1-13.
Barga et al., "Consistent Streaming Through Time: A Vision for Event Stream Processing", Microsoft Research Redmond, WA, barga.jongold,t-mohali,t-minhon}_@microsoft.com, 11 pages.
Kramer, "Continuous Queries over Data Streams—Semantics and Implementation", pp. 1-291.

* cited by examiner

CEP ENGINE AND METHOD FOR PROCESSING CEP QUERIES

This application claims priority to European Application No. 10196502.8, filed 22 Dec. 2010, the entire contents of which is hereby incorporated by reference.

1. TECHNICAL FIELD

The present technology relates to a complex event processing (CEP) engine and a method for processing CEP queries.

2. THE PRIOR ART

Modern computer systems oftentimes operate on data streams, i.e. on consecutive sequences of data items captured by sensors, sensor networks or other data source(s), wherein the already received data items are processed while further data items are still captured by the sensor. The processed data items are typically used for detecting time-critical complex events and for generating corresponding alerts and/or error messages. A typical application scenario is a security system such as facility surveillance system, where streams of data items captured by a card reader are processed in order to identify unauthorized access to confidential areas within the facility or other abnormal behavior of the people entering and leaving a building. Further application scenarios include road traffic management, location tracking, medical monitoring, manufacturing processes, network traffic monitoring, business activity monitoring and fraud detection.

While the detection of abnormal behavior relating to one single data item/event is rather straight-forward (e.g. determining that a person's ID card has expired when the card is read by the card reader), most real-life scenarios require the detection of more complex situations that relate to multiple data items within the streams (e.g. that a person entered a certain room, but did not leave the room after a predetermined amount of time). In this context, the data of a plurality of sensors is typically analyzed, wherein a sensor may comprise a hardware sensor, software sensor, software application, or the like. This processing paradigm is generally known as complex event processing (CEP).

Complex event processing (CEP) introduces several important paradigm changes with respect to classical database technology, where the data is relatively static and various queries can be formulated in order to retrieve the desired data. In CEP, however, the queries are comparatively fixed and fed with continuously arriving streams of data. As explained above, CEP queries typically correlate multiple input data items, look for patterns and produce output events in the form of alerts, error messages or the like when a certain pattern is observed.

In summary, CEP applications (also known as CEP engines) have to deal with highly transient event data that arrives continuously at very high rates and have to produce the corresponding output events/alerts as soon as possible, ideally nearly in real-time. This includes push-based processing (also known as data driven processing) within main memory, which denotes a data flow approach where data to process is not requested (pulled) by the processing operator on demand or using certain scheduling techniques, but is directly provided (pushed) to the processing operator when it becomes available. The U.S. Pat. Nos. 7,676,461 B2 and 7,457,728 B2 provide further background information about complex event processing (CEP).

When processing CEP queries, the representation model of data streams plays an important role with respect to resource requirements such as memory and CPU usage, as well as with respect to the liveliness and reaction time of a CEP system.

In the prior art, two general data stream representation models have been proposed: The positive-negative approach and the time interval approach. Additional approaches are known for specialized CEP engines and future developments are likely to yield additional approaches.

The positive-negative approach is spread widely in the scientific community, especially within the US. Therefore, most commercially available CEP engines originating from corresponding university spin-offs use this approach. As a running example on temporal representation models of data streams, we consider models that assign a validity based on a discrete time axis to each element of the data stream. The example data stream is in this example called "PersonsInRoom" and carries information about persons (i.e. their name and age) being within a room. The data stream element ("Alex", 35) is valid (i.e. in the room) from time 10 (inclusive) to time 30 (exclusive) and ("Jolie", 25) is valid from time 20 (inclusive) to 40 (exclusive). In the positive-negative approach, the exemplary data stream would be represented by an element (("Alex", 35), 10, +), which indicates that ("Alex", 35) becomes valid at time 10. In the example, this element is followed by an element (("Jolie", 25), 20, +), an element (('Alex', 35), 30, −) indicating that ("Alex", 35) becomes invalid at time 20, and a final element (("Jolie", 25), 40, −). Further information on the positive-negative approach can be found in "*The CQL Continuous Query Language Semantic Foundations and Query Execution*" by Arvind Arasu, Shivnath Babu, and Jennifer Widom (VLDB Journal, 15(2):121-142, 2006) and "*Incremental Evaluation of Sliding-Window Queries over Data Streams*" by Thanaa M. Ghanem, Moustafa A. Hammad, Mohamed F. Mokbel, Walid G. Aref, and Ahmed K. Elmagarmid (IEEE Transactions on Knowledge and Data Engineering (TKDE), 19(1)7-72, 2007).

The time interval approach was, amongst others, propagated by the University of Marburg. In the above exemplary data stream "PersonsInRoom", the stream would be represented in the time interval approach by two stream elements, the first being (("Alex", 35), [10, 30)), indicating that ("Alex", 35) is valid in the half-open time interval [10,30), and the second one being (("Jolie", 25), [20, 40)), indicating that ("Jolie", 25) is valid in the half-open time interval [20, 40). The time interval approach is currently employed in the CEP engine RTM Analyzer of applicant. Further information on the time interval approach can be found in "*A Temporal Foundation for Continuous Queries over Data Streams*" by Jürgen Krämer and Bernhard Seeger (Technical Report, No. 38, Department of Mathematics and Computer Science, University of Marburg, July 2004. 11th International Conference on Management of Data (COMAD), January 6-8, Goa—India), "*Semantics and implementation of continuous sliding window queries over data streams*" by Jürgen Krämer and Bernhard Seeger (ACM Trans. Database Syst. 34(1): (2009)) and "*Consistent Streaming Through Time: A Vision for Event Stream Processing*" by Roger S. Barga, Jonathan Goldstein, Mohamed H. Ali, Mingsheng Hong (CIDR 2007: 363-374). Additional information on further data stream representation approaches can be found in "*Continuous Queries over Data Streams—Semantics and Implementation*" by Jürgen Krämer (Dissertation, Philipps-University Marburg, Marburg, 2007).

The positive-negative approach has higher resource consumption than the time interval approach for most kinds of queries. In some cases this overhead can be significant. On the other hand, there are scenarios where the positive-negative approach can produce results earlier, which increases the liveliness of the CEP engine. This can be of considerable advantage if fast answers are crucial. As a simple example, we consider a simple filter function that just accepts Persons with a name starting with "A" in the above exemplary data stream "PersonsInRoom", so that this filter function accepts the data stream element ("Alex", 35), but rejects ("Jolie", 25). If the positive-negative approach is used, the computation to determine whether a string starts with "A" will have to be applied to all four data stream elements in the stream (see above), thereby accepting the first and the third element. Using the time interval approach, this computation has to be applied only twice, as there are only two stream elements, in this case accepting only the first one. Analogous to this example, using the positive-negative approach, most computations have to be done twice, as compared to the time interval approach, so that the time interval approach is less processing intensive in certain cases. As with regards to liveliness, we consider an aggregation function that counts the data stream elements valid within the stream. The results for the both exemplary representations would be as follows: ((1), 10, +), ((1), 20, -), ((2), 20, +), ((2), 30, -), ((1), 30, +), ((1), 40, -) and ((1), [10, 20)), ((2), [20, 30)), ((1), [30,40)). The information that "2" becomes the valid count at time instant 20 could be send out at time instant 20 for the positive negative approach, while in the time interval approach this information will usually be sent out at time instant 30, as the system has to wait for the count 2 becoming invalid again in order to determine the validity interval for 2. In contrast, the positive-negative approach uses a separate element to send the information about 2 becoming invalid again. As a result, the positive-negative approach has advantages with respect to liveliness in this case.

A variety of CEP engines are available today, e.g. West-Global Vantify, Progress Apama, StreamBase, SQLstream, ruleCore, WebSphere Business Events, IBM System S/InfoSphere Streams, Tibco BusinessEvents, SAP/Sybase/Coral8/Aleri, UC 4 Senactive, Event Zero, Active Insight, Pion CEP, Esper/EsperTech, ETAILS, Intelligent Event Processor, JBoss Drools Fusion, Truviso, Oracle, Microsoft StreamInsight, Nastel, EventGnosis and Informatica.

Due to the above-explained different focuses, advantages and disadvantages of the various known data representation models, all known CEP engines specialize to only one of these approaches while accepting its disadvantages. At first glance, this is no disadvantage, since e.g. the positive-negative approach and the time interval approach produce logically equivalent results and thus using only one of these approaches in a particular CEP engine seems to be sufficient. Using only one approach also has the benefit of having to implement and maintain only the chosen approach.

However, being limited to one special approach implies suffering from the drawbacks of that approach for certain kinds of queries, which can be disadvantageous depending on the requirements of the particular CEP application scenario.

It is therefore the technical problem underlying the present technology to provide an improved CEP engine and a corresponding method that allows a more efficient processing CEP queries depending on the particular requirements, thereby at least partly overcoming the above explained disadvantages of the prior art.

3. SUMMARY OF THE TECHNOLOGY

This problem is according to one aspect of the technology solved by a complex event processing (CEP) engine for processing CEP queries over data streams. In the embodiment of claim 1, the CEP engine comprises:
a. a parser, adapted for parsing a received CEP query into a logical query graph; and
b. a translator, adapted for translating the logical query graph into a physical query plan in accordance with one of a plurality of data stream representations; wherein
c. the logical query graph is independent of the plurality of data stream representations.

Accordingly, the embodiment defines a complex event processing engine (CEP engine) for processing CEP queries over data streams. Similar to the known approach of processing conventional database queries, a CEP query received by the CEP engine is first parsed by a parser and thereby transformed into a logical query graph. The logical query graph is then translated by a translator of the CEP engine into a physical query plan, which is finally responsible for executing the query. The translation performed by the translator is in accordance with one of a plurality of data stream representations, such as the above-explained positive-negative approach, time interval approach or any other suitable approach. Preferably, only this translation differs partly with respect to the respective data stream representation model. Importantly, the produced logical query graph is independent of the data stream representation model.

As an example, we consider a CEP query asking for "Which are the ages of persons of age up to 30 within the room?" in the exemplary data stream "PersonsInRoom" explained further above. This CEP query may be formulated in SQL for data streams as "SELECT age FROM PersonsInRoom WHERE age<=30". The parsing of this CEP query into a logical query graph could result in the logical query graph depicted in FIG. 1. This logical query graph represents the actions that have to be taken in order to process the CEP query, namely selecting the age of the persons within the stream "PersonsInRoom" and checking whether their age is 30 or less. As can be seen in FIG. 1, this logical query graph only defines the logical structure of what to do to process the CEP query, but does not refer to any kind of concrete temporal data stream representation approach.

Figure 2A:
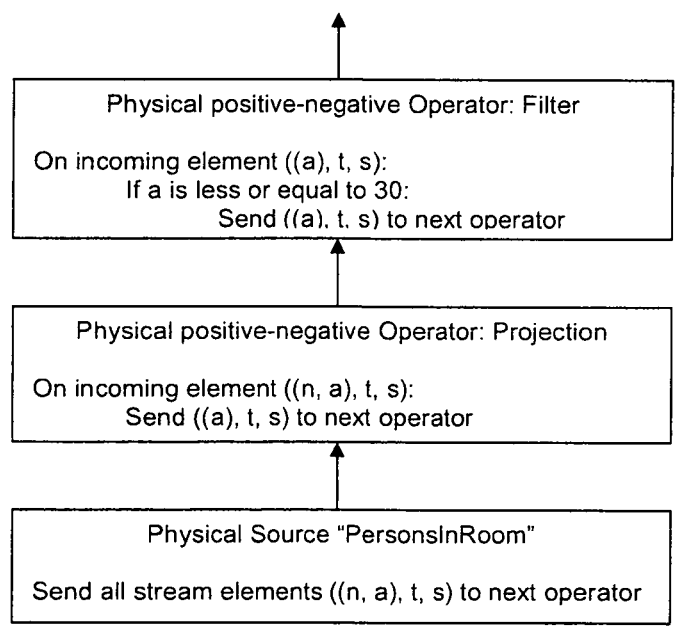
Figure 2B:
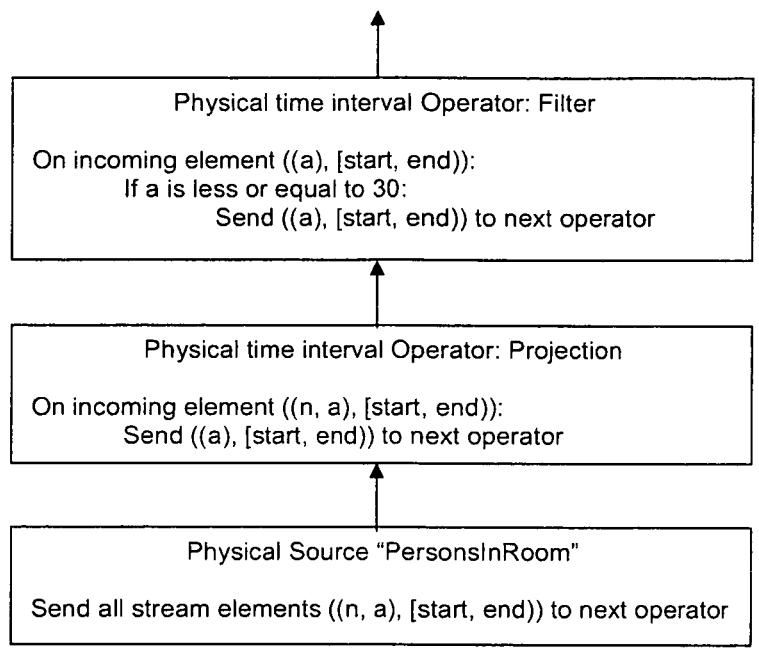

The translator then translates this logical query graph into a physical query plan that consists of concrete operators able to execute the CEP query. An exemplary physical query plan in accordance with the positive-negative approach is shown in FIG. 2a. As can be seen, this physical query plan depends on the concrete temporal representation approach (the positive-negative approach), as it has to take account of how the individual data stream elements are build up. Another physical query plan, namely one for the time interval approach, is shown in FIG. 2b.

As a result, in the present technology a variety of different data stream representation approaches can be supported, in particular the positive-negative and the time interval approach, within the same CEP-engine in parallel, but without the need for laborious and error-prone representation model-specific adaptations of many of the CEP engine's components, such as the parser. This is preferably achieved by making the used data stream representation model a parameter of the query translation process and the components of the CEP engine, especially the query graph, as explained in more detail further below.

Since according to the technology, the actual data stream representation model affects the CEP query (pre-)processing only as late as possible (i.e. on the level of the physical query plan), the present CEP engine provides the opportunity to execute CEP queries using the approach most suitable depending on the specific requirements. For example, the positive-negative approach may be chosen if liveliness is crucial for a given CEP query, while the time interval approach may be used in order to significantly reduce system load. However, the chosen representation model is according to the technology a parameter of the CEP engine, so that the CEP query itself, as well as the logical query graph generated therefrom is the same, regardless of the data stream representation model.

In one aspect of the present technology, the CEP engine comprises an optimizer, adapted for optimizing the logical query graph to produce an optimized logical query graph, wherein the optimized logical query graph is independent of the plurality of data stream representations. Accordingly, the optional optimization process taking place between the above-explained parsing and translating steps is also independent of the data stream representation approach. With reference to the above-explained exemplary query plans of FIGS. 1, 2a and 2b, it is apparent to those skilled in the art that they are not very clever from a processing point of view. This is because each element is projected to the "age" attribute, even if the element is filtered out later. Therefore, it would be much better to revise the plans as shown in the optimized logical query graph in FIG. 3. Importantly, the optimizer of the present technology may perform this optimization independently of the temporal data stream representation model. In particular, the optimization may be performed by just using the (representation model-independent) logical query graph. Doing these optimizations is the original task of the optimizer.

In another aspect, the physical query plan comprises at least one query building block that is independent of the plurality of data stream representations. Accordingly, the building blocks of the physical query plan preferably also only differ in those parts which depend on the used data stream representation. For example, various aspects such as thread data flow, synchronization, communication and/or administration are preferably handled independently of the actual data stream representation. As an example, the direction "If a is less or equal to 30" is the same in both filter operators of the two physical query plans shown in FIGS. 2a and 2b. This is because the semantics of filtering does not depend on the data stream representation model, but only on the data. As a result, the instructions needed for the check "If a is less or equal to 30" can be generated by the translator the same way, independently from the specific representation model. Not only does this significantly decrease implementation effort, it also eases the interoperability of all data stream representations within the same CEP engine.

Furthermore, the optimizer may be adapted for selecting one of the plurality of data stream representations and the translator may be adapted for translating the logical query graph into a physical query plan in accordance with the selected data stream representation. Accordingly, in this aspect of the technology the optimizer chooses the data stream is representation model most suitable for the given CEP query.

In the above-mentioned aspect, the capability of the optimizer is even extended in that the optimizer is also adapted to choose the temporal data stream representation model for the respective CEP query. As the optimizer tries to find an optimal solution, it is enabled to rate the different possible solutions. This rating may be performed by the optimizer based on user-selected preferences such as "lowest number of age comparisons". As explained above, independently of the approach, with regard to age comparisons, query plans that perform the filtering before the projection will be better. The filter operator in the time-interval approach needs to do only half the number of comparisons than in the positive-negative approach (as there will be only half the number of stream elements; see above). Therefore, if only these two approaches are available, for the exemplary plan shown in FIG. 1 and the goal of fewer computations, the optimizer would choose the time interval approach.

Other approaches are also possible, e.g. letting a user choose a data stream representation model, e.g. on a per-query-basis or by setting corresponding user preferences of the CEP engine. The user may also be advised by a recommendation system of the present CEP engine based on information from the query optimization. In this aspect, alternatively or in addition to letting the user define certain configuration preferences (e.g "I always prefer less computations"; see above), the system of the present technology may present the findings of the optimizer (positive-negative better with regard to lifelines, but time interval better with regard to CPU usage) to the user and let him make the decision. Especially, the recommendation system only has to present those facts that differ for the data stream representation approaches, but may ignore those which are the same for all approaches. For example, memory usage is an important criterion on the quality of a query plan. But for the above example, both plans need (almost) no memory. Therefore, memory usage would not be mentioned during the recommendation of the recommendation system. Of course, also a combination of the above-described approaches is possible.

Additionally or alternatively, the CEP engine may be further adapted for changing the selected data stream representation during processing of the CEP query. Accordingly, the decision which data stream representation to use may even be changed later on, e.g. based on changed data stream characteristics and/or better statistical information gathered by the CEP engine. As an example, we consider a user in our example aggregation query (counting the persons in the room) who wants to optimize the CEP query processing with respect to the following criteria: "On average, I need an update of the count at least 10 time units after the count changed. If this is the case, I prefer the approach which requires less computation". A typical statistic on a data stream is how often an element arrives. If this statistic denotes that an element arrives every 2 time units on average, the optimizer may choose the time interval approach, as this approach needs fewer computations. If the data stream slows down over time and now only delivers an element every 12 time units on average, the count will not change as often as the user requested and the optimizer may decide to switch to the positive-negative approach in order to increase lifeliness. A necessary query transformation may apply the new choice afterwards.

In yet another aspect, the CEP engine further comprises at least one operator translator, adapted for translating data elements of at least one data stream to be processed by the CEP query from a first data stream representation to a second data stream representation. Accordingly, in this aspect there is even no need to choose a single data stream representation model for a given CEP query at all. For example by inserting operators translating data items from one representation model to another, the CEP engine may employ several data stream representation approaches within the same query graph. As a result, each part of the query processing may profit from the benefits of the suitable approaches at hand. For example, a data stream element represented in the time interval approach, such as element ((x), [start, end)) may be translated into the two elements ((x), start, +) and ((x), end, −) according to the positive negative approach. The other way around, after receiving ((x), start, +), the conversion from the positive-negative approach to the time interval approach may wait for an element ((x), end, −) and then transfers ((x), [start, end)).

Moreover, a method is provided for (pre-)processing CEP queries over data streams, wherein the method comprises the steps of parsing a received CEP query into a logical query graph and translating the logical query graph into a physical query plan in accordance with one of a plurality of data stream representations, wherein the logical query graph is independent of the plurality of data stream representations.

Further advantageous modifications of embodiments of the method of the technology are defined in further dependent claims.

Lastly, the present technology concerns a computer program comprising instructions for implementing any of the above methods.

4. SHORT DESCRIPTION OF THE DRAWINGS

Figure 3:
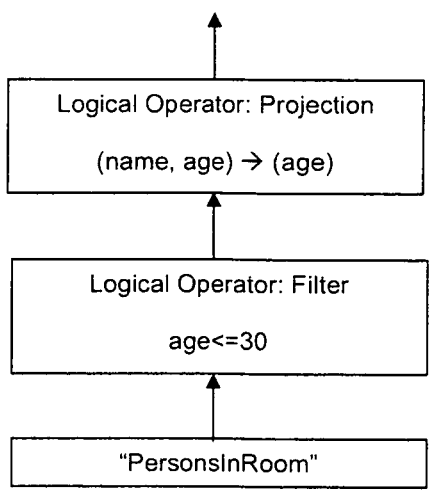
Figure 4:
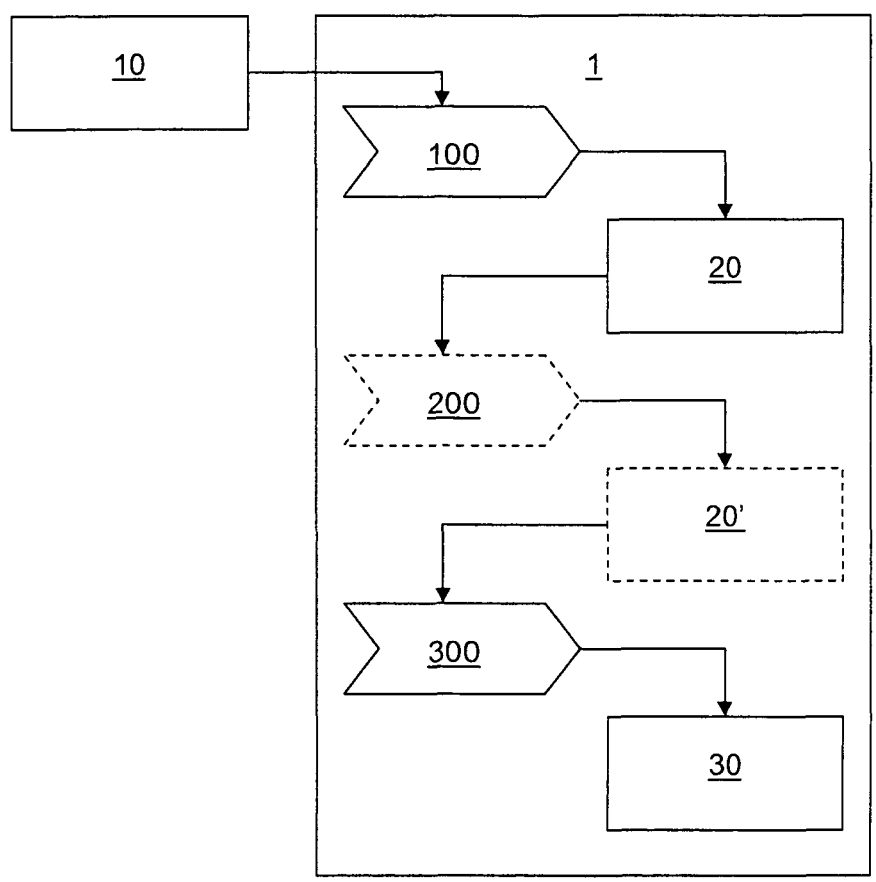
Figure 5:
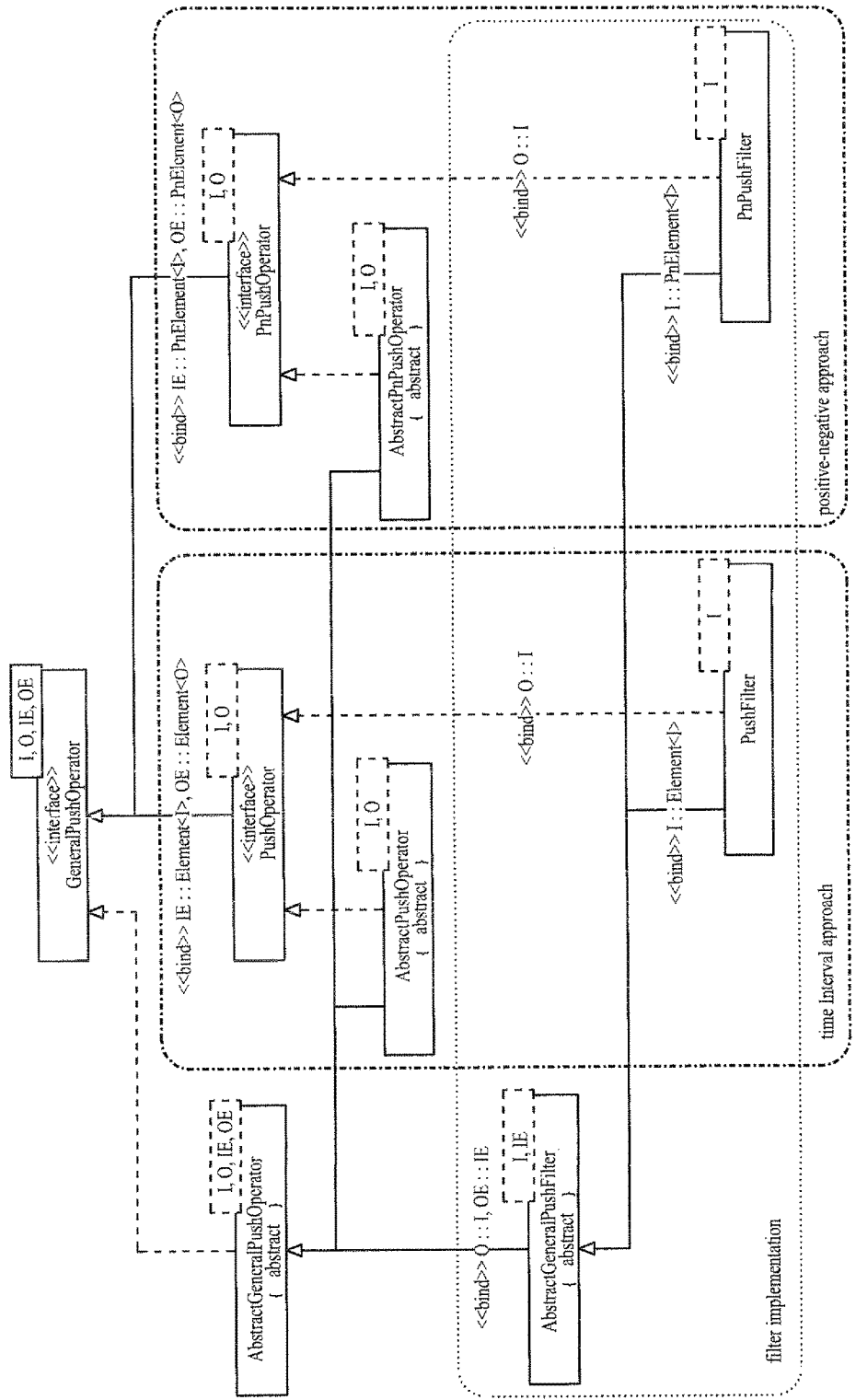
Figure 6:
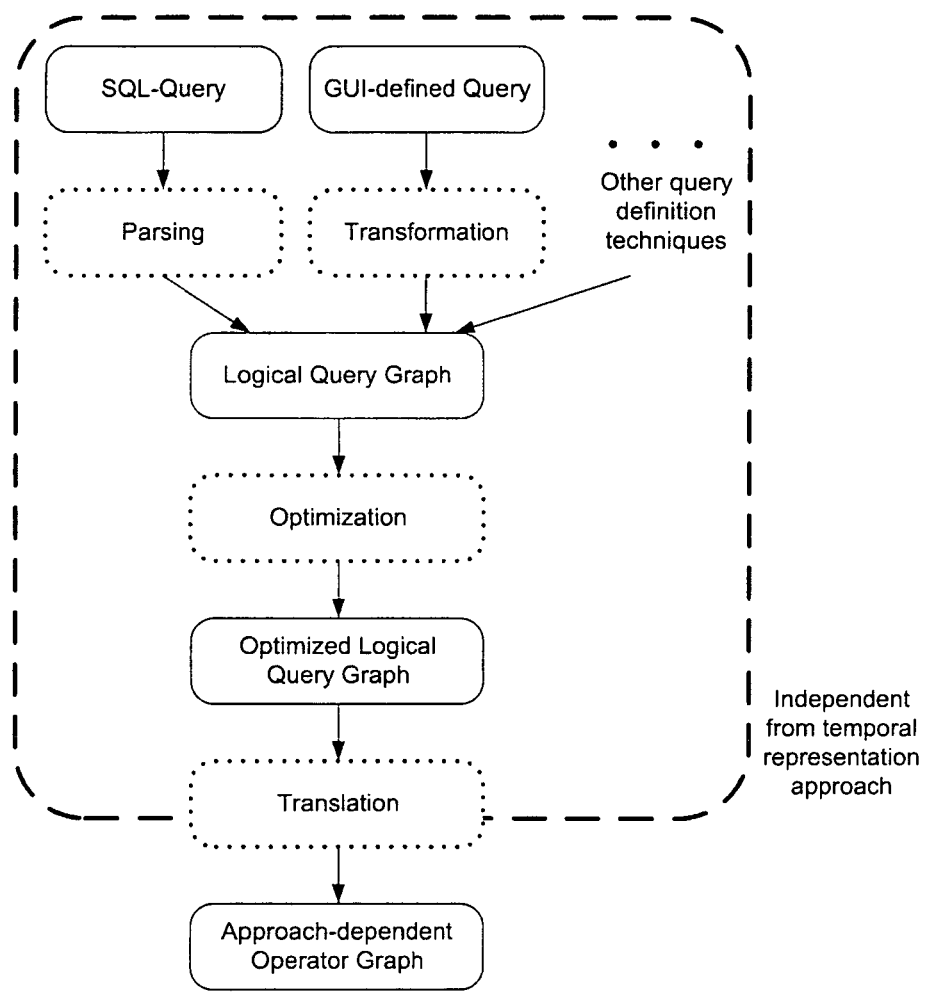

In the following detailed description, presently preferred embodiments of the technology are further described with reference to the following figures:

FIG. 1: An exemplary logical query graph of a CEP query according to an embodiment;

FIG. 2*a*: An exemplary physical query plan adhering to the positive-negative approach according to an embodiment;

FIG. 2*b*: An exemplary physical query plan adhering to the time interval approach according to an embodiment;

FIG. 3: An exemplary optimized logical query graph according to an embodiment;

FIG. 4: A schematic overview of a CEP engine according to an embodiment;

FIG. 5: A class diagram showing an exemplary Java implementation of an embodiment; and FIG. 6: A schematic overview of the phases involved in (pre-) processing a CEP query according to an embodiment.

5. DETAILED DESCRIPTION

In the following, a presently preferred embodiment is described with respect to a method for (pre-)processing CEP queries over data streams as schematically shown in FIG. 1, which is performed by a CEP engine 1. As can be seen, the CEP engine 1 comprises a parser 100, an optional optimizer 200 and a translator 300. The CEP engine 1 is adapted for receiving one or more CEP queries 10. The parser 100 parses a received CEP query 10 into a logical query graph 20 is in the exemplary embodiment of FIG. 1 optimized by the optimizer 200 to produce an optimized logical query graph 20'. The optimized logical query graph 20' and / or the logical query graph 20 are the input of the translator 300, which produces a physical query plan 30 that is finally executable to yield the query results from one or more data streams in accordance with the CEP query 10. While the embodiment shown in FIG. 1 focuses on the components for pre-processing a given CEP query, it will be appreciated that the present CEP engine 1 may comprise further components, such as an execution engine (not shown in FIG. 1) for eventually executing the generated physical query plan 30 in order to yield the query results intended by the CEP query 10.

The present technology mainly relies on identifying which aspects of a CEP engine depend on the representation model of data streams and which do not. Although the data stream representation model substantially influences computation, many CEP engine components, such as authorization or authentication are completely independent of the concrete representation (since they are not involved in the query execution process itself and therefore are not affected by the data stream representation approach at all), while others may just store the chosen approach as a parameter. Therefore, in order to support several data stream representation models, it is sufficient to provide corresponding versions of the remaining system components. For example, CEP queries may be added to or removed from a CEP engine at runtime. In order to be able to find a CEP query to be removed, it may be stored in a repository that allows for finding the physical operators executing the query. Within this repository, also the information which approach is currently used for executing the query may be stored. Thereby, the temporal representation model used for a query becomes a parameter of the repository, while it not affects the main functionality of the repository.

But even as the physical query graph 30 of a CEP engine responsible for executing the CEP query 10 really depends on the representation model used, main aspects of many of its components are still independent from it. For example, a filter operator will always apply a filter predicate on the data part of events contained in the input data stream(s), no matter how the temporal information associated with the event is represented. This allows implementing several versions of building blocks of the system with respect to different representation models.

Another important finding is that the basic structure of the (logical) query graph typically does not differ with respect to the temporal representation model. Similar to database systems that are independent of the techniques to specify queries to the system (e.g. SQL languages and/or graph-based graphical user interfaces (GUIs)), CEP engines typically create a logical graph representing the basic query structure. This logical query plan 20 is then the object of query optimization by the optimizer 200. Afterwards, this logical query plan 20 and / or optimized logical query plan 20' is translated into a physical query graph 30, which is used to execute the CEP query 10. The present technology influences this process at several stages:

First of all, the logical translation/parsing 100 takes place independent of the data stream representation. Afterwards, the representation model is preferably used as a parameter for the translation process 300. Thereby, even the translation 300 will not differ much per approach, but rather choose the corresponding building blocks dependent on the approach where needed, but independent as far as possible. For example, a filter predicate of an SQL WHERE-clause may be translated into a query predicate operation independently from the temporal representation model.

Exemplary implementation

In the following, a Java-based implementation of parts of the CEP engine 1 of the present technology as shown in FIG. 2 will be explained. It should be noted that Java is only one of a variety of suitable programming languages and that the present technology may be implemented in any other programming language.

Generic operator implementation: To efficiently support a hybrid data representation model (i.e. to support various different data stream representation models), the exemplary implementation uses Java-templates to make the representation model a parameter of the operator framework. This is reflected in the definition of the interface GeneralPushOperator (cf. FIG. 2), which is the basis for all operators explained further below:

```
interface GeneralPushOperator
    <I, O, IE extends GeneralElement<I>, OE extends
GeneralElement<O>>
```

The I and O parameters parameterize the types of input and output, while IE and OE parameterize their representation as elements of event streams. Sub-interfaces of GeneralElement are used to specify the different temporal representation models, such as positive-negative (PnElement) or time interval approach (Element).

Using these parameters, interfaces define properties of operators for a certain data stream representation approach, e.g. the time interval approach:

```
interface PushOperator<I, O>
    extends GeneralPushOperator<I, O, Element<I>,
Element<O>>
```

Concrete operators may now be implemented in a generic way for several data stream representation approaches. For example, the filter operation may be defined in the following class:

```
class GeneralPushFilter<T, TE extends GeneralElement<T>>
    extends AbstractUnarySingleGeneralPushOperator<T, T,
TE, TE>
```

These generic implementations may then be specialized further to a certain data stream representation approach, for example the time interval approach:

```
class PushFilter<T>
    extends GeneralPushFilter<T, Element<T>> implements
PushOperator<T, T>
```

A very important advantage of the above-explained technique is that the specialized versions only vary slightly with respect to their constructor parameters, while most of them are shared via their common superclass.

FIG. 2 shows an example of the above-described filter implementation for the time interval and the positive-negative approach as a simplified UML class diagram. Note that the main implementation effort is spent for the classes on the left hand, while the specialization on the right hand does not take much additional effort and can be done easily for additional approaches.

Approach-independent query representation: CEP queries 10 are first translated/parsed 100 into a logical query graph 20, which is completely independent from the data stream representation model which is used later to execute the CEP query 10. The logical query graph 20 may now be subject to query optimization 200. Furthermore, decisions on which data stream representation model to choose for execution may be made on the basis of the logical query graph 20 and/or the optimized logical query graph 20'.

FIG. 3 shows that most of the work needed for transforming a CEP query into the approach-dependent physical operator graph 30 can take place independently of the chosen temporal representation approach.

Approach-parameterized query translation: The logical query graph 20 and/or the optimized logical query graph 20' is afterwards translated 300 into the operator graph 30 used for executing the CEP query 10. The translation 300 preferably takes several parameters:

```
(QueryTranslator queryTranslator, Node node,
TranslationOptions translationOptions)
```

While "node" represents the node of the logical query plan 20/optimized logical query plan 20' which is to be translated 300 by the query translator "queryTranslator", the options "TranslationOptions" of the translation options, amongst other things, specify the approach to use for the translation 300:

```
interface TranslationOptions {
    Approach getTargetApproach(); . . .
```

The corresponding translation process 300 now produces a translation using the given data stream representation approach. In order to do so, it may compute common parameters independent of the approach and may only perform one or more minor approach-dependent modification(s). For example, the computation of the query predicate "theta" of a filter may be done independently of the target approach (while it is still passed to the translation process due to the common interface):

```
MetaDataPredicate<Record> theta =
    queryTranslator.translate(Nodes.getNode(node,
    PREDICATE), translationOptions);
switch (translationOptions.getTargetApproach()) {
    case TIME_INTERVAL: return new
PushFilter<Record> (. . .);
    case POSITIVE_NEGATIVE: return new
PnPushFilter<Record> (. . .);
    . . .
```

Hybrid approach usage: In order to support operator graphs using multiple approaches for executing a CEP query 10, operators may be provided that convert events included in the one or more processed data streams from one representation model to another. For example, the PushToPnPush-operator converts from the time interval to the positive-negative approach:

```
class PushToPnPush<T>
    extends AbstractUnarySingleGeneralPushOperator<T, T,
Element<T>, PnElement<T>>
```

Approach selection: The selection of the data stream representation approaches to use may be subject to user choice. In some embodiments, based on user specifications such as preferences for low resource consumption or high lifeliness, this may be done by the optimizer 200 by analyzing the operators involved and accessing a corresponding pre-defined rating with regard to their properties based on the supported data stream representation approaches.

It will be appreciated that as used herein, the terms system, subsystem, service, programmed logic circuitry, and the like may be implemented as any suitable combination of software, hardware, firmware, and/or the like. It also will be appreciated that the storage locations herein may be any suitable combination of disk drive devices, memory locations, solid state drives, CD-ROMs, DVDs, tape backups, storage area network (SAN) systems, and/or any other appropriate tangible computer readable storage medium. It also will be appreciated that the techniques described herein may be accomplished by having a processor execute instructions that may be tangibly stored on a non-transitory computer readable storage medium or the like.

The invention claimed is:

1. A system comprising at least one processor and a complex event processing (CEP) engine for processing CEP queries over data streams, the at least one processor controlling the system to:
parse a received CEP query into a logical query graph that is independent of a plurality of data stream representation models;
translate the logical query graph into a physical query plan in accordance with a selected data stream representation model from the plurality of data stream representation models, the data stream representation model selected based on preferences related to processing resources used by the CEP engine, the data stream representation model usable as a parameter in the translation process; and
execute the translated physical query plan using the data stream representation model selected from the plurality of data stream representation models based on the logical query graph, wherein
the plurality of data stream representation models comprise one or more approaches for executing the received CEP query, the one or more approaches corresponding to specific requirements for executing the received CEP query by the CEP engine.

2. The system of claim 1, wherein the logical query graph is optimized to produce an optimized logical query graph, wherein the optimized logical query graph is independent of the plurality of data stream representation models.

3. The system of claim 2, wherein one of the plurality of data stream representation models is selected and the logical query graph is translated into a physical query plan in accordance with the selected data stream representation model.

4. The system of claim 3, wherein the selected data stream representation model is changed during processing of the CEP query.

5. The system of claim 2, wherein solutions associated with one or more of the plurality of data streams are rated to optimize the logical query graph and the data stream representation model is selected from the plurality of data stream representation models in accordance with an operating criteria.

6. The system of claim 2, wherein operators involved in the plurality of data streams are analysed and the data stream representation model is selected based on the involved operators and a rating of properties based on supported data stream representation models.

7. The system of claim 1, wherein the physical query plan comprises at least one query building block that is independent of the plurality of data stream representation models.

8. The system of claim 1, wherein data elements of at least one data stream to be processed by the CEP query are translated from a first data stream representation model to a second data stream representation model.

9. The system of claim 1, wherein the plurality of data stream representation models are indicative of how one or more processing resources in the system are going to be utilized by the CEP engine.

10. The system of claim 1, wherein the one or more approaches include a positive-negative and a time interval approach, the positive-negative approach utilizing a greater system load than the time interval approach.

11. A method implemented in an information processing apparatus having at least one processor and a complex event processing (CEP) engine for processing CEP queries over data streams, the method comprising:
a. parsing, via the at least one processor, a received CEP query into a logical query graph that is independent of a plurality of data stream representation models;
b. translating, via the at least one processor, the logical query graph into a physical query plan in accordance with a selected data stream representation model from the plurality of data stream representation models, the data stream representation model selected based on preferences related to processing resources used by the information processing apparatus, the data stream representation model usable as a parameter in the translation process; and
c. executing, via the at least one processor, the translated physical query plan using the data stream representation model selected from the plurality of data stream representation models based on the logical query graph, wherein
the plurality of data stream representation models comprise one or more approaches for executing the received CEP query, the one or more approaches corresponding to specific requirements for executing the received CEP query by the CEP engine.

12. The method of claim 11, further comprising optimizing the logical query graph to produce an optimized logical query graph, wherein the optimized logical query graph is independent of the plurality of data stream representation models.

13. The method of claim 12, wherein the optimizing comprises selecting one of the plurality of data stream representation models and wherein the translating comprises translating the logical query graph into a physical query plan in accordance with the selected data stream representation model.

14. The method of claim 13, further comprising changing the selected data stream representation model during processing of the CEP query.

15. The method of claim 11, wherein the physical query plan comprises at least one query building block that is independent of the plurality of data stream representation models.

16. The method of claim 11, further comprising translating data elements of at least one data stream to be processed by the CEP query from a first data stream representation model to a second data stream representation model.

17. A non-transitory computer readable storage medium tangibly storing a computer program comprising instructions for using a complex event processing (CEP) engine for processing CEP queries over data streams that, when executed, cause a computer to:
parse a received CEP query into a logical query graph that is independent of a plurality of data stream representation models;
translate the logical query graph into a physical query plan in accordance with a selected data stream representation model from the plurality of data stream representation models, the data stream representation model selected based on preferences related to utilized processing resources, the data stream representation model usable as a parameter in the translation process; and execute the translated physical query plan using the data stream representation model selected from the plurality of data stream representation models based on the logical query graph, wherein the plurality of data stream representation models comprise one or more approaches for executing the received CEP query, the one or more approaches corresponding to specific requirements for executing the received CEP query by the CEP engine.

18. The non-transitory computer readable storage medium of claim 17, further comprising optimizing the logical query graph to produce an optimized logical query graph, wherein the optimized logical query graph is independent of the plurality of data stream representation models.

19. The non-transitory computer readable storage medium of claim 18, wherein the optimizing comprises selecting one of the plurality of data stream representation models and wherein the translating comprises translating the logical query graph into a physical query plan in accordance with the selected data stream representation model.

20. The non-transitory computer readable storage medium of claim 17, wherein the physical query plan comprises at least one query building block that is independent of the plurality of data stream representation models.

21. The non-transitory computer readable storage medium of claim 17, further comprising translating, by at least one operator, data elements of at least one data stream to be processed by the CEP query from a first data stream representation model to a second data stream representation model.

* * * * *